United States Patent
Roever

(10) Patent No.: US 8,543,746 B2
(45) Date of Patent: Sep. 24, 2013

(54) SELF-SYNCHRONIZING DATA STREAMING BETWEEN ADDRESS-BASED PRODUCER AND CONSUMER CIRCUITS

(75) Inventor: Jens Roever, Los Gatos, CA (US)

(73) Assignee: NXP B.V., Eindhoven (NL)

( * ) Notice: Subject to any disclaimer, the term of this patent is extended or adjusted under 35 U.S.C. 154(b) by 748 days.

(21) Appl. No.: 11/917,624

(22) PCT Filed: Jun. 23, 2006

(86) PCT No.: PCT/IB2006/052068
§ 371 (c)(1),
(2), (4) Date: Jul. 7, 2009

(87) PCT Pub. No.: WO2006/137044
PCT Pub. Date: Dec. 28, 2006

(65) Prior Publication Data
US 2009/0300256 A1 Dec. 3, 2009

Related U.S. Application Data

(60) Provisional application No. 60/694,113, filed on Jun. 24, 2005.

(51) Int. Cl.
| G06F 13/00 | (2006.01) |
| G06F 3/00 | (2006.01) |
| G06F 5/00 | (2006.01) |
| G06F 13/36 | (2006.01) |
| G06F 1/04 | (2006.01) |
| G06F 1/12 | (2006.01) |
| G06F 15/16 | (2006.01) |
| G06F 13/42 | (2006.01) |
| H04L 5/00 | (2006.01) |
| H04L 7/00 | (2006.01) |

(52) U.S. Cl.
USPC .......... 710/100; 710/29; 710/58; 710/60; 710/61; 710/306; 710/308; 710/310; 713/375; 713/400; 713/401

(58) Field of Classification Search
USPC ............... 710/29, 58, 60, 61, 100, 306, 308, 710/310; 713/375, 400, 401
See application file for complete search history.

(56) References Cited

U.S. PATENT DOCUMENTS 3,810,114 A * 5/1974 Yamada et al. .............. 710/306
4,232,294 A * 11/1980 Burke et al. ................. 370/444
(Continued)

FOREIGN PATENT DOCUMENTS

JP 63184962 A * 7/1988
JP 02228141 A * 11/1990
(Continued)

OTHER PUBLICATIONS

"NA901158: Address Compare Synchronization", Nov. 1, 1990, IBM, IBM Technical Disclosure Bulletin, vol. 33, Iss. 6A, pp. 58-60.*

(Continued)

Primary Examiner — Faisal M Zaman

(57) ABSTRACT

A circuit arrangement and method facilitate the direct streaming of data between producer and consumer circuits (12P, 12C) that are otherwise configured to communicate over an address-based network (18). Sync signals (46, 56) are generated for each of producer and consumer circuits (12P, 12C) from the address information encoded into requests that communicate the data streams output by the producer circuit (12P) and expected by the consumer circuit (12C). The sync signals (46, 56) for the producer and consumer circuits (12C) are then used to selectively modify the data stream output by the producer circuit (12P) to a format expected by the consumer circuit (12C). Typically, such modification takes the form of inserting data into the data stream when the consumer circuit (12C) expects more data than output by the producer circuit (12P), and discarding data communicated by the producer circuit (12P) when the consumer expects less data than that output by the producer circuit (12P).

33 Claims, 7 Drawing Sheets

(56) References Cited

U.S. PATENT DOCUMENTS

| | | | |
|---|---|---|---|
| 4,320,452 A | 3/1982 | Kempf et al. | |
| 4,328,559 A * | 5/1982 | Markhasin et al. | 710/58 |
| 4,413,341 A * | 11/1983 | Markhasin et al. | 714/699 |
| 4,494,192 A * | 1/1985 | Lew et al. | 710/112 |
| 5,185,680 A * | 2/1993 | Kakubo | 360/72.2 |
| 5,390,103 A * | 2/1995 | Sakakibara | 713/375 |
| 5,537,416 A * | 7/1996 | MacDonald et al. | 714/748 |
| 5,592,684 A * | 1/1997 | Gaskins et al. | 710/52 |
| 5,603,016 A * | 2/1997 | Davies | 713/400 |
| 5,796,996 A * | 8/1998 | Temma et al. | 712/225 |
| 5,859,986 A * | 1/1999 | Marenin | 713/401 |
| 5,923,855 A * | 7/1999 | Yamazaki | 709/248 |
| 5,978,831 A * | 11/1999 | Ahamed et al. | 718/105 |
| 6,134,155 A * | 10/2000 | Wen | 365/189.04 |
| 6,240,458 B1 * | 5/2001 | Gilbertson | 709/232 |
| 6,247,072 B1 * | 6/2001 | Firestone | 710/53 |
| 6,275,878 B1 * | 8/2001 | Yashima et al. | 710/61 |
| 6,330,682 B1 * | 12/2001 | Kanazashi et al. | 713/400 |
| 6,400,785 B1 | 6/2002 | Sunaga et al. | |
| 6,611,889 B1 * | 8/2003 | Otsuka | 710/100 |
| 6,665,751 B1 * | 12/2003 | Chen et al. | 710/52 |
| 6,718,449 B2 * | 4/2004 | Phi | 711/167 |
| 7,120,761 B2 * | 10/2006 | Matsuzaki et al. | 711/149 |
| 7,197,581 B2 * | 3/2007 | Kohashi | 710/28 |
| 7,216,185 B2 * | 5/2007 | Kato | 710/52 |
| 7,349,998 B2 * | 3/2008 | Hirose et al. | 710/29 |
| 7,694,061 B2 * | 4/2010 | Franchuk et al. | 710/310 |
| 2002/0026599 A1 * | 2/2002 | Kanazashi et al. | 713/400 |
| 2003/0156220 A1 * | 8/2003 | Narita | 348/571 |
| 2003/0185325 A1 * | 10/2003 | Wahl | 375/362 |
| 2003/0233513 A1 * | 12/2003 | Ezoe | 711/103 |
| 2004/0006666 A1 * | 1/2004 | Moss | 711/5 |
| 2005/0280650 A1 * | 12/2005 | Komagata | 345/531 |
| 2007/0130395 A1 * | 6/2007 | Hsu | 710/61 |
| 2007/0162168 A1 * | 7/2007 | Thompson | 700/94 |
| 2008/0122976 A1 * | 5/2008 | Kubota | 348/530 |
| 2009/0172456 A1 * | 7/2009 | Seo et al. | 713/400 |
| 2011/0167292 A1 * | 7/2011 | Bohno | 713/400 |

FOREIGN PATENT DOCUMENTS

| | | | |
|---|---|---|---|
| JP | 07307732 A * | 11/1995 | |
| JP | 08138369 A * | 5/1996 | |
| JP | 08149121 A * | 6/1996 | |
| JP | 11016346 A * | 1/1999 | |
| JP | 2012058973 A * | 3/2012 | |
| WO | 2004063836 A2 | 7/2004 | |
| WO | 2004099995 A2 | 11/2004 | |
| WO | 2005010759 A1 | 2/2005 | |

OTHER PUBLICATIONS

"NN77112382: Programmable Storage Address Compare", Nov. 1, 1977, IBM, IBM Technical Disclosure Bulletin, vol. 20, Iss. 6, pp. 2382-2390.*

"NN77091562: Address Controlled Clocking of Recirculating Memories", Sep. 1, 1977, IBM, IBM Technical Disclosure Bulletin, vol. 20, Iss. 4, pp. 1562-1564.*

"NN71122172: Memory Address Sync and Stop Controller", Dec. 1, 1971, IBM, IBM Technical Disclosure Bulletin, vol. 14, Iss. 7, pp. 2172-2173.*

* cited by examiner

SELF-SYNCHRONIZING DATA STREAMING BETWEEN ADDRESS-BASED PRODUCER AND CONSUMER CIRCUITS

This invention relates to the field of electronic design, and in particular to a memory access system and method for streaming data between circuits in an electronic design.

The communication of data between circuits in an electronic design is often a significant factor in the overall performance of the electronic design. Particularly in complex, high performance integrated circuits such as System On Chip (SOC) designs, the communication of data between circuits such as IP blocks often plays a significant role in the processing capability of such designs.

In many instances, IP blocks rely on address-based networks to communicate data to and from other IP blocks. In an address-based network, data packets are associated with specific addresses in a memory address space, which effectively serve to identify each data packet in a manner that is recognizable both to producer circuits that transmit data and consumer circuits that receive data. In some instances, push-type communications can be used, where a producer of data acts as a master, and pushes data to a consumer of data acting as a slave. In other instances, pull-type communications can be used, where a consumer of data acts as a master, and polls data from a producer acting as a slave.

In still other instances, a shared memory may be used facilitate the communication of data between IP blocks. To communicate data between IP blocks coupled to a shared memory, one IP block, serving as a producer of the data, writes the data to the shared memory over an address-based network using address-based communications. Then, another IP block, serving as a consumer of the data, reads the now-stored data from the shared memory over the same address-based network, again using address-based communications.

Shared memory-based communications offer a number of benefits in terms of design flexibility and reuse. Since each data packet is associated with a specific address, the data packet is easier to correlate between the producer and consumer IP blocks. Furthermore, specific IP blocks can be designed to utilize a standardized interface, which reduces the amount of customization required to utilize an IP block in a specific design.

In addition, the operations of producer and consumer IP blocks in a shared memory architecture typically need not be tightly coordinated or synchronized. Due to this flexibility, shared memory architectures are particularly useful in connection with processing data streams such as video data streams. Often, a producer IP block will write a frame of video data to a shared memory, while a consumer IP block will read the frame of video data and perform additional processing on the data. Furthermore, in some instances the consumer IP block may not even be required to read all of a video frame stored by a producer IP block, e.g., when it is desirable to display only a portion of a video frame.

One drawback with the use of a shared memory architecture, however, is that bandwidth to and from a shared memory is a limited resource. Producer and consumer IP blocks, as well as potentially other IP blocks in a circuit design, are required to share access to the memory. Should too many IP blocks attempt to access the shared memory at the same time, the throughput of each block can suffer.

Due to these limitations, therefore, it may be desirable or even necessary in some designs to utilize dedicated, negotiated connections between some IP blocks. By doing so, contention over access to a shared memory is reduced, thus enabling higher communication rates and greater data throughput. With a dedicated connection, however, address information is not used, and strict synchronization is required to ensure that the data being communicated by a producer is properly received by the consumer, typically by ensuring that the amount of data produced is the same as the amount of data consumed. In the case of video data, for example, strict synchronization is often required to ensure that each frame of video data sent by a producer is recognized as a complete frame of video data by a consumer. If, for example, a producer transmitted more or less data in a frame than was expected by a consumer, data intended for one frame of video data may be interpreted by the consumer as being incorporated into an adjacent frame of video data. Once frames become unaligned, spurious artifacts, or even a moving picture may result in the displayed video picture.

IP blocks with dedicated connections tend to have more limited applicability in a narrower set of end use applications. Moreover, producer and consumer IP blocks that communicate over a dedicated connection typically must be specifically configured to ensure that the proper alignment of produced and consumed data streams is ensured. On the other hand, it would be desirable in many circumstances to simply be able to adapt existing IP blocks configured for address-based communications to communicate over a dedicated connection. Prior attempts to adapt such IP blocks to use dedicated connections have simply discarded address information, and have required strict control over the amount of data communicated to ensure continued alignment and synchronization of the producer and consumer data streams. Often, once data streams lose synchronization and become unaligned, a reset is required to restore synchronization of the data streams. Therefore, a need continues to exist in the art for a manner of enabling IP blocks that support address-based communications to communicate over dedicated connections.

The invention addresses these and other problems associated with the prior art by providing a circuit arrangement and method that facilitate the direct streaming of data between producer and consumer circuits that are otherwise configured to communicate over an address-based network. In particular, embodiments consistent with the invention generate sync signals for each of producer and consumer circuits from the address information encoded into requests that communicate the data streams output by the producer circuit and expected by the consumer circuit. The sync signals for the producer and consumer circuits are then used to selectively modify the data stream output by the producer circuit to a format expected by the consumer circuit. Typically, such modification takes the form of inserting data into the data stream when the consumer circuit expects more data than output by the producer circuit, and discarding data communicated by the producer circuit when the consumer expects less data than that output by the producer circuit.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

Figure 1:
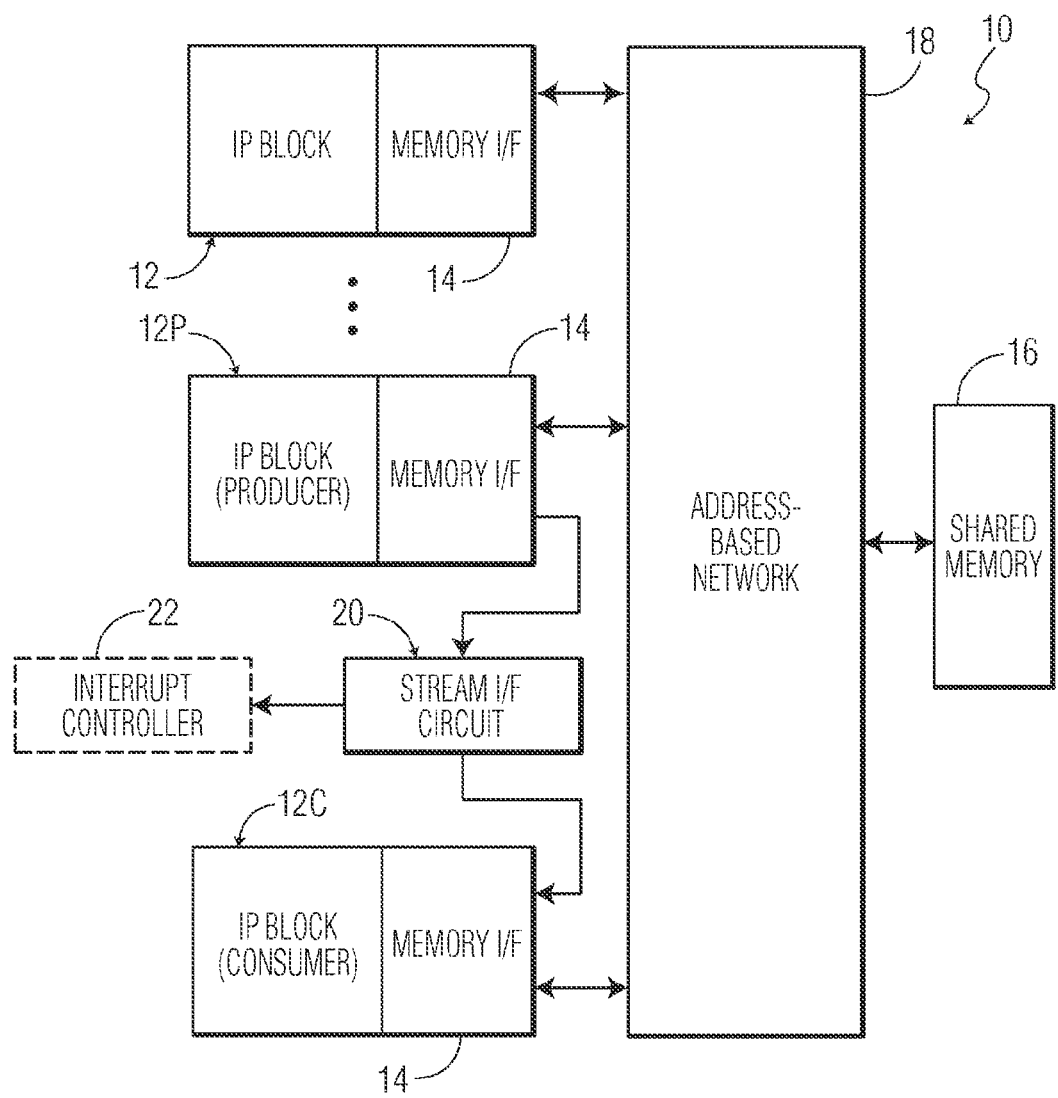
FIG. 1 illustrates an example block diagram of an integrated circuit incorporating multiple circuits coupled to one another over an address-based network, and incorporating self-synchronizing data streaming consistent with the invention.

The embodiments discussed hereinafter utilize self-synchronization to facilitate the direct streaming of data between producer and consumer circuits in an electronic design. In particular, the address information encoded into memory access requests generated by producer and consumer circuits in connection with respectively outputting and receiving data streams is used to generate producer and consumer sync signals. These signals are used, in turn, to self-synchronize the data stream output by the producer circuit with that expected by the consumer circuit.

Such self-synchronization incorporates selectively modifying the data stream output by the producer circuit to a format expected by the consumer circuit. Typically, such modification takes the form of inserting data into the data stream when the consumer circuit expects more data than output by the producer circuit, and discarding data communicated by the producer circuit when the consumer expects less data than that output by the producer circuit.

Often, the generation of sync signals is based upon detection of boundaries between blocks of data incorporated into a data stream. As such, a sync signal may be asserted, for example, in response to detecting the first address in a memory block being output by a producer circuit or received by a consumer circuit. As will be discussed in greater detail below, for example, it may be assumed in some environments that a memory block is a contiguous range of memory addresses, such that a sync signal may be asserted whenever an address for a current request is found to be less than or equal to (i.e., not greater than), that of the previous request. Moreover, in video streaming applications, it may be desirable to detect the end of a line of video data, as well as the end of a frame of video data, and provide two dimensional (i.e., horizontal and vertical) self-synchronization. Other manners of deriving a sync signal from address information will be appreciated by one of ordinary skill in the art having the benefit of the instant disclosure.

A producer circuit consistent with the invention may be any circuit capable of outputting a data stream, while a consumer circuit consistent with the invention may be any circuit capable of receiving a data stream. It will be appreciated that producer circuits may also function as consumer circuits, and vice versa. In the illustrated embodiments, producer and consumer circuits are implemented as IP blocks suitable for incorporation into the same integrated circuit design such as a SOC design. However, it will be appreciated that such circuits need not be implemented as modular blocks, nor do such circuits need to be disposed on the same integrated circuit device. The invention is therefore not limited to the particular embodiments discussed herein.

As noted above, each producer and consumer circuit is configured to communicate over an address-based network, typically through the issuance of read or write requests that incorporate address information associated with the data that is to be read or written as a result of the requests. It will be appreciated that address information may be provided on dedicated interconnect wires, or may be communicated over the same interconnect wires as the request and/or data to be communicated. Moreover, a producer or consumer circuit may still be able to communicate over an address-based network concurrently with communicating with another circuit via a self-synchronized dedicated connection as described herein.

Now turning to the drawings, wherein like numbers denote like parts throughout the several views, FIG. 1 illustrates an integrated circuit 10 incorporating a plurality of circuits 12, e.g., IP blocks, each having a dedicated address-based memory interface 14 that is used to couple the associated circuit 12 to a shared memory 16 via an address-based network 18. Address-based network 18 may be implemented, for example, as a Pipelined Memory Access Network (PMAN) such as is disclosed in PCT Publication No. WO2004099995, the disclosure of which is incorporated by reference herein. In the alternative, other types of address-based networks, e.g., pull-type architectures, push-type architectures, multi-drop bus architectures, etc., may be used in the alternative.

As noted above, each circuit, or IP block, 12 is typically configured to communicate over an address-based network. In general, it will be appreciated that any circuit that generates requests to transmit and/or receive data, where the data is associated with and identified by address information, may be considered to be configured to communicate over an address-based network. To this extent, each memory interface 14 is configured to output memory access requests including command and address information (and for write requests, write data) over network 18. Furthermore, in the case of read requests, each memory interface 14 is configured to receive read data from network 18 responsive to requests issued thereby.

As also noted above, it may be desirable to provide self-synchronized direct data streaming between IP blocks, and thus bypass the need to utilize a shared memory to communicate data between the IP blocks, e.g., a producer IP block identified at 12P and a consumer IP block identified at 12C. To implement such functionality, a stream interface circuit 20, coupled intermediate IP blocks 12P, 12C, provides a direct communication link configured in a manner described in greater detail below. When so configured, IP blocks 12P and 12C are capable of communicating a data stream from IP block 12P to IP block 12C by respectively issuing series of write memory access requests and read memory access requests to stream interface circuit 20.

In the illustrated embodiment, stream interface circuit 20 is coupled to additional ports defined in the memory interface circuits 14 for IP blocks 12P, 12C. Such ports may be provided along with ports for coupling to address-based network 18, thus enable both address-based communication and direct data streaming to be utilized by each such IP block. In other embodiments, however, an IP block configured for communication over an address-based network may not actually be coupled to any address-based network in integrated circuit design. Thus, it will be appreciated that an IP block configured for communication over an address-based network need not necessarily actively communicate over such a network when incorporated into a working design.

Figure 2:
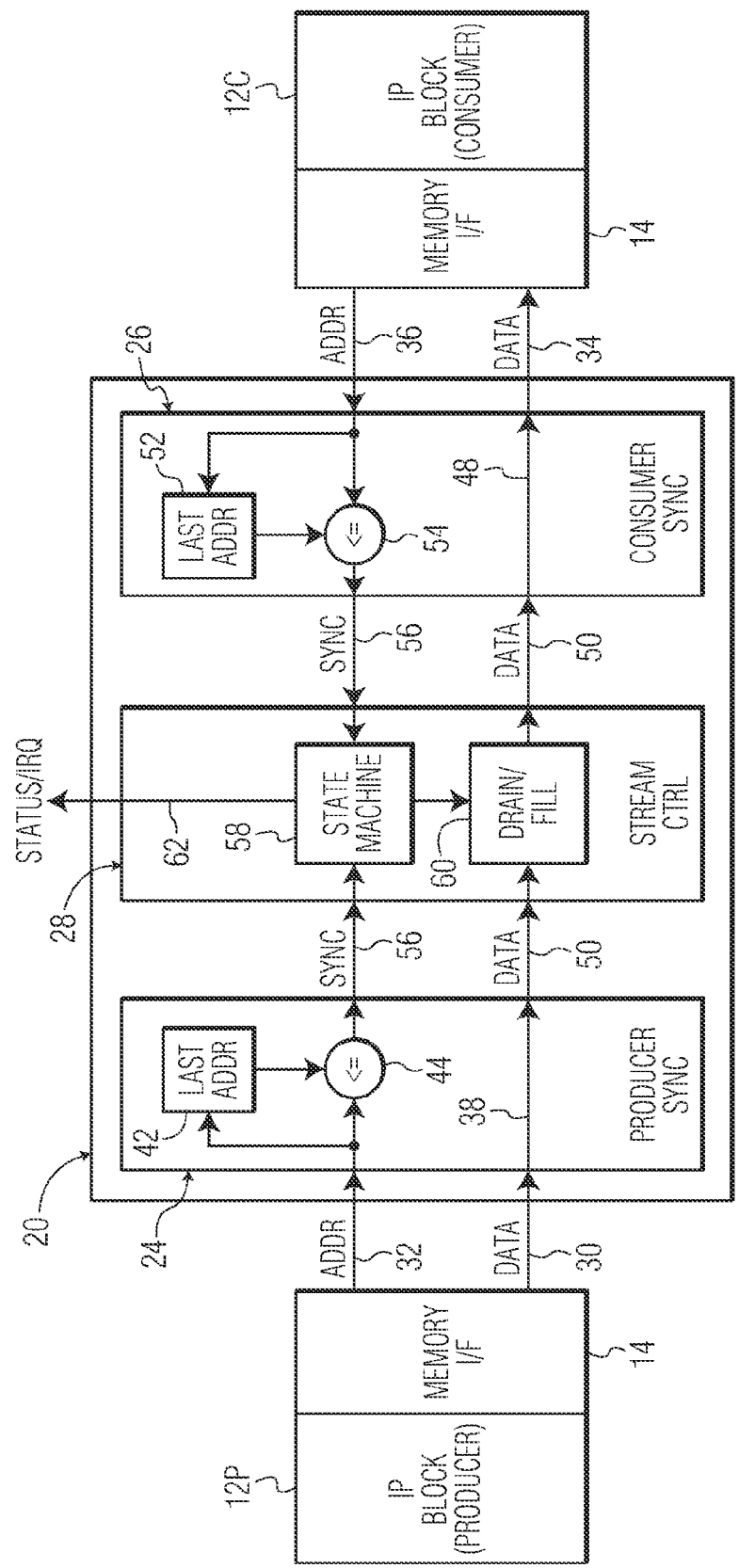
FIG. 2 illustrates an example block diagram of an exemplary implementation of the stream interface circuit of FIG. 1.

Now turning to FIG. 2, an exemplary implementation of stream interface circuit 20 is illustrated in greater detail. Circuit 20 incorporates a pair of sync generation circuits, a producer sync generation circuit 24 and a consumer sync generation circuit 26, coupled to a stream control circuit 28. Producer sync generation circuit 24 is coupled to a producer IP block 12P and is configured to receive a data stream over a data interconnect 30, with packets of data in the data stream correlated via associated address information received over an address interconnect 32. Likewise, consumer sync generation circuit 26 is coupled to a consumer IP block 12C and is configured to output a data stream over a data interconnect 34 responsive to address information received over an address interconnect 36. It will be appreciated that additional request information, e.g., command information, read/write information, priority information, etc. may also be received, conveyed and/or utilized by circuit 20 consistent with the invention.

Producer sync generation circuit 24 is configured to selectively assert a sync signal that indicates the beginning of a memory block of data in a data stream. In this embodiment, it is assumed that a memory block communicated by IP block 12P includes a set of requests addressed to a contiguous range of memory addresses in a memory address space. As such, the beginning of a memory block of data can be detected by comparing the address associated with each request output by IP block 12P with the address associated with the prior request output by the IP block.

As a result, for each request received from IP block 12P, circuit 24 passes the data for such request unchanged over interconnect 38 and to stream control circuit 28 via a data interconnect 40. However, for the address associated with each request, the address is passed to a last address register 42 and a comparator 44. Register 42 stores the address associated with a previous request for use by comparator 44 in comparing the previous, or last address, with that of the current request. By passing the address of the current request to register 42, the address will be stored in the register for use in comparing with the next request received by circuit 24. Comparator 44 selectively asserts a producer sync signal 46 responsive to the address associated with the current request being less than or equal to that of the last request, and thus indicates when the current request is directed to a first address in a new memory block.

Consumer sync generation circuit 26 is likewise configured to selectively assert a sync signal that indicates the beginning of a memory block of data in a data stream expected by the consumer IP block 12C. For each request received from IP block 12C, circuit 26 passes the data for such request from stream control circuit 28 over interconnects 48, 50 and along to IP block 12C. However, for the address associated with each request, the address is passed to a last address register 52 and a comparator 54, which operate in a similar manner to register 42 and comparator 44 to selectively assert a consumer sync signal 56 responsive to the address associated with the current request being less than or equal to that of the last request, and thus indicates when the current request is directed to a first address in a new memory block.

Figure 3:
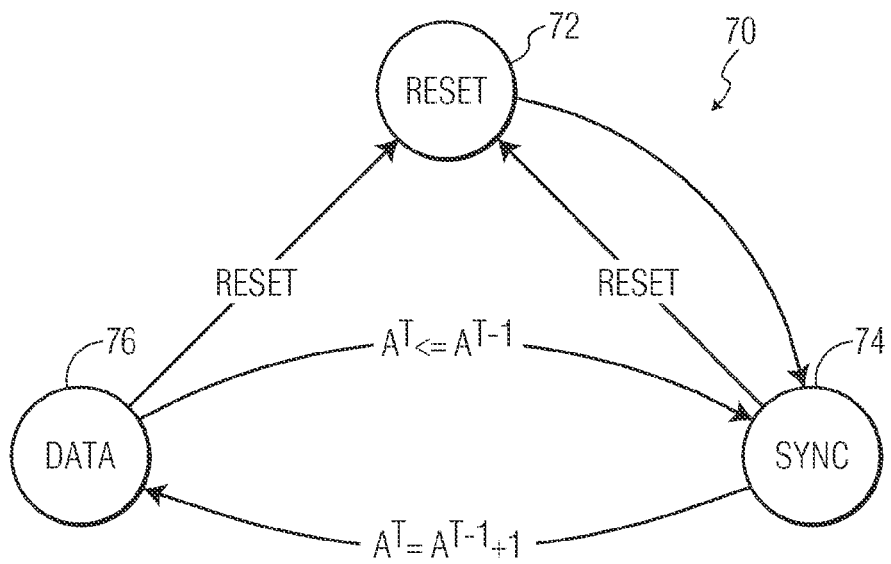
FIG. 3 illustrates an example state diagram of the operation of the producer and consumer sync circuits of FIG. 2.

The manner in which each sync circuit 24, 26 operates is further explained in connection with the state diagram 70 of FIG. 3. State diagram 70 includes a reset state 72 to which each circuit 24, 26 is initially set. Reset state 72 transitions to a sync state 74 during which the respective sync signal 46, 56 is asserted. A transition to a data state 76, where the sync signal 46, 56 is not asserted, occurs once a request is received having an address (AT) that represents the next sequential address relative to that of the previous request (stored in register 42, 52, and represented as AT-1). Then, once a request is received having an address that is less than or equal to that of the previous request, a transition occurs to state 74 to reassert the sync signal 46, 56, indicating the start of a new memory block. In addition, upon a reset, each of states 74, 76 transitions to state 72.

Returning to FIG. 2, the configuration of stream control circuit 28, which receives data from a producer data stream over interconnect 40 and outputs data to a consumer data stream over interconnect 50, is further illustrated. Circuit 28 includes a state machine 58 that is responsive to sync signals 46, 56 to control a drain/fill circuit 60 that selectively modifies the consumer data stream output to consumer IP block 12C relative to the producer data stream received from producer IP block 12P. Specifically, drain/fill circuit 60 may be configured to selectively drain, or discard, data from the producer data stream and/or fill or insert data into the producer data stream to align the producer and consumer data streams. In addition, state machine 58 may optionally be configured to output a status or interrupt signal 62 whenever a misalignment occurs, to notify other circuitry in the design (e.g., an interrupt controller 22 as shown in FIG. 1).

Figure 4:
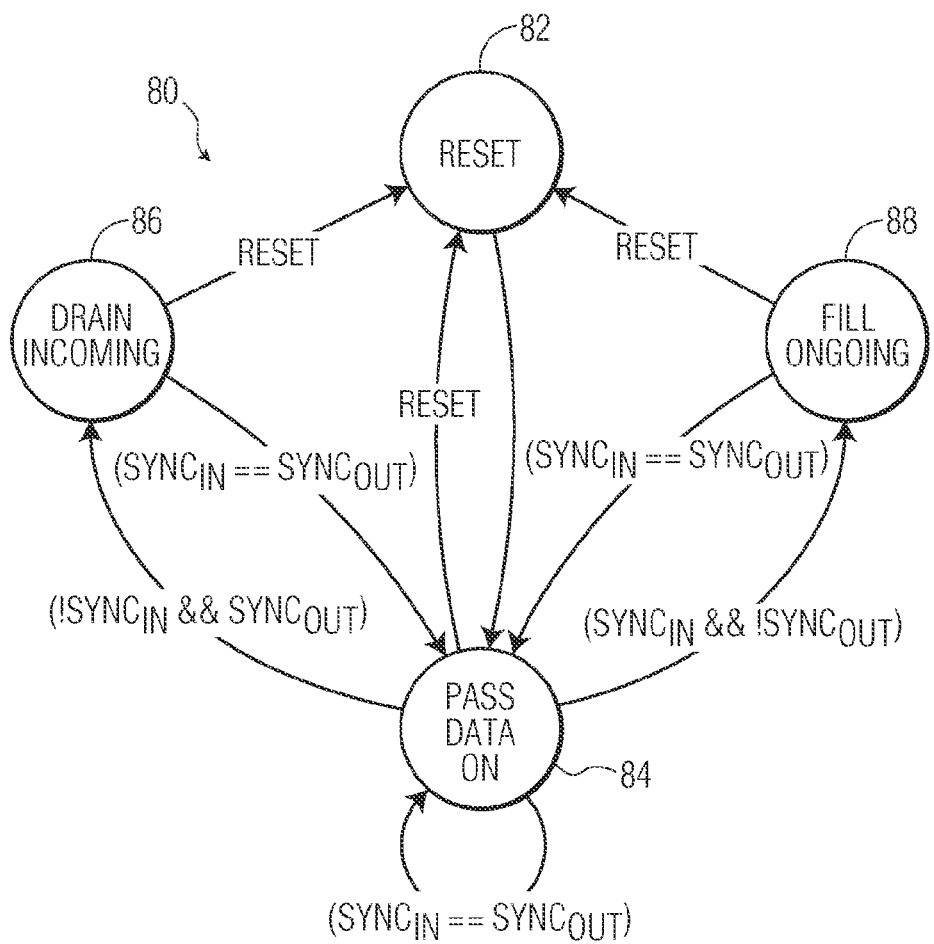
FIG. 4 illustrates an example state diagram of the operation of the state machine in the stream control circuit of FIG. 2.

With reference to FIG. 4, the operation of state machine 58 is further illustrated by state diagram 80. Initially, state machine 58 begins in a reset state 82, and then transitions to a pass data on state 84. Based upon whether the producer sync signal 46 (SYNCIN) and the consumer sync signal 56 (SYNCOUT) are asserted during each communication cycle, the state machine either remains in state 84 or transitions to one of a drain incoming state 86 and a fill outgoing state 88. Specifically, if sync signals 46, 56 are in the same state, state machine 58 remains in state 84, whereby data forwarded from the producer data stream is passed unchanged to the consumer data stream.

However, if consumer sync signal 56 is asserted before producer sync signal 46, a transition occurs to state 86, which results in state machine 58 controlling drain/fill circuit 60 to discard data from the producer IP block 12P, and thus prevent such data from being passed on to the consumer IP block 12C. In addition, it may be desirable at this time to stall the consumer IP block 12C from issuing any further requests, using any number of manners known in the art (e.g., via handshaking). State machine 58 remains in this state until sync signals 46, 56 are once again equal, which results in a transition back to state 84.

If producer sync signal 46 is asserted before consumer sync signal 56, a transition occurs to state 88, which results in state machine 58 controlling drain/fill circuit 60 to insert padding data into the consumer data stream. In addition, it may be desirable at this time to stall the producer IP block 12P from issuing any further requests. State machine 58 remains in this state until sync signals 46, 56 are once again equal, which results in a transition back to state 84. In addition, upon a reset, each of states 84, 86, 88 transitions to state 82.

The padding data to be inserted into a data stream by circuit 60 may vary in different embodiments. For example, a constant value may be used for the padding data, or in the alternative, the last data value passed from the producer IP block may simply be repeated. In addition, it may be desirable in some embodiments to allow the padding data to be programmable. For example, in a video processing application, it may be desirable to enable padding data representative of a black or grey pixel to be used.

Therefore, it may be seen that through the operation of state machine 58 responsive to sync signals 46, 56, the amount of data communicated in a data stream by producer IP block 12P is selectively modified if necessary to match the amount of data expected by consumer IP block 12C. Furthermore, through this self-synchronization, the respective producer and consumer data streams are effectively aligned at each memory block boundary. Of note, the address information associated with each request from the producer and consumer IP blocks is never passed to the other block. Rather, other than being used to generate the respective sync signals, the address information is effectively discarded, thus enabling address-based protocols to effectively be used to communicate a data stream over a direct connection between IP blocks.

Figure 5:
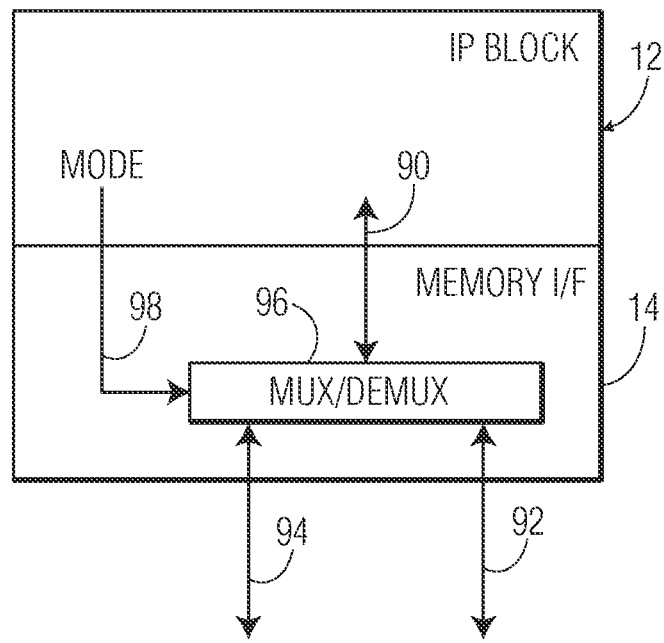
FIG. 5 illustrates an example block diagram of an exemplary implementation of the memory interface circuits of FIG. 1.
Figure 6:
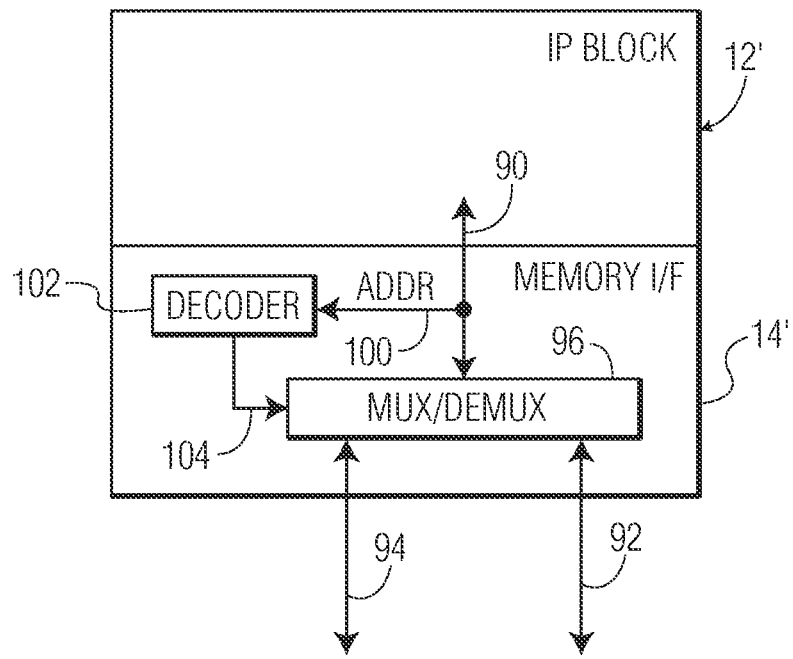
FIG. 6 illustrates an example block diagram of an alternate exemplary implementation of the memory interface circuits of FIG. 1.

Now turning to FIGS. 5 & 6, as noted above, the manner in which an IP block may be configured to utilize self-synchronized data streaming, while still being configured to communicate over an address-based network, may differ in various embodiments. FIG. 5, for example, illustrates one exemplary implementation of the memory interface circuit 14 of an IP block 12, wherein a request communication link 90, which communicates command and address information, as well as data, associated with access requests, is coupled to a pair of communication links 92, 94 through a multiplexer/demultiplexer 96. In the illustrated embodiment, for example, communication link 92 may be used to communicate over an address-based network, while communication link 94 may be used to communicate via self-synchronized data streaming through coupling with a stream interface circuit 20. It will also be appreciated that memory interface 14 may also incorporate functionality for providing handshaking as well as ensuring that requests and data transmissions comply with any necessary communication protocols.

In the embodiment of FIG. 5, it is assumed that multiplexer/demultiplexer 96 is responsive to a mode signal 98 generated by IP block 12, which is used to effectively select one of the two communication links 92, 94 for use by IP block 12. It will be appreciated that the mode signal may be selectively asserted in a dynamic manner whenever it is desired to communicate over a particular link. In the alternative, the mode signal may be set to a constant value, either as a result of software or of customization of the IP block, to select either of the communication links 92, 94 on a permanent basis.

As another alternative, as shown in FIG. 6, an alternate memory interface 14' for an IP block 12' may include communication links 90, 92, 94 and multiplexer/demultiplexer 96, but with control over multiplexer/demultiplexer 96 being implemented by passing one or more address signals 100 from communication link 90 to a decoder block 102 to generate a control signal 104. By doing so, a designer may be able to designate certain memory ranges for directing requests to either of communication links 92, 94. In one embodiment, for example, it may be desirable to simply utilize the highest order address bit to select between communication links 92, 94, thus enabling, for example, direct data streaming to be utilized simply by issuing requests where the highest order address bit is asserted. Other manners of selecting between different communication links in a programmatic manner will be appreciated by one of ordinary skill in the art having the benefit of the instant disclosure.

Now turning to FIG. 7, it may be desirable in some embodiments to perform two-dimensional synchronization, rather than single dimensional as described in connection with FIGS. 2-6. In particular, in many video processing environments, it may be desirable to synchronize data streams responsive to both horizontal and vertical dimensions of producer and consumer video frames.

Figure 7:
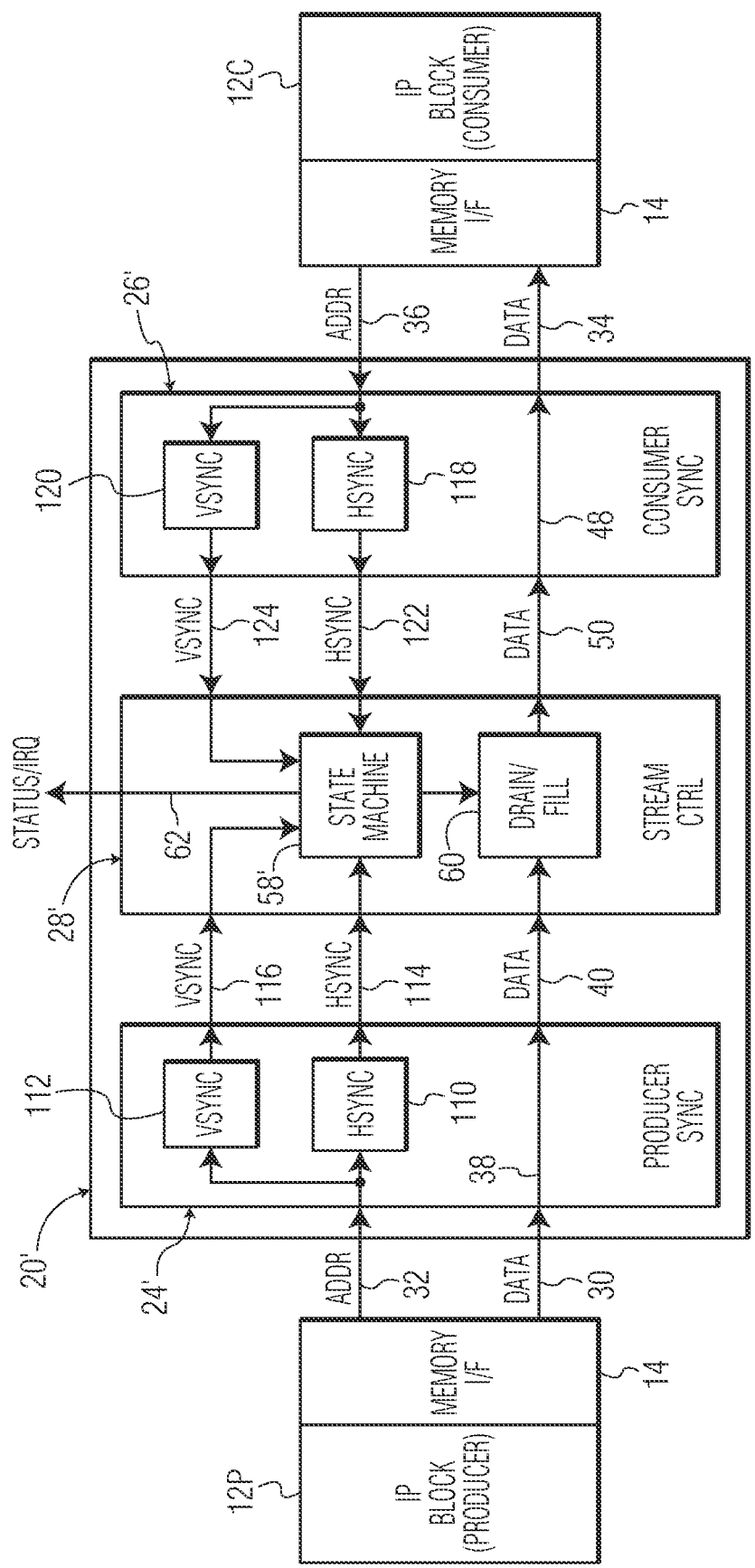
FIG. 7 illustrates an example block diagram of another exemplary implementation of the stream interface circuit of FIG. 1, suitable for use with horizontal and vertical syncing.

FIG. 7 illustrates a stream interface circuit 20' that includes a producer sync generation circuit 24', consumer sync generation circuit 26' and stream control circuit 28'. Circuit 24' is similarly configured to circuit 24 of stream interface circuit 20 of FIG. 2, differing in that horizontal and vertical sync generating circuits 110, 112 are used to generate separate horizontal and vertical sync signals 114, 116 from the address information associated with each request issued by IP block 12P. Likewise, circuit 26' is similarly configured to circuit 26 of stream interface circuit 20, differing in that horizontal and vertical sync generating circuits 118, 120 are used to generate separate horizontal and vertical sync signals 122, 124 from the address information associated with each request issued by IP block 12C. Circuit 26' is likewise configured in a similar manner to circuit 26 of stream interface circuit 20; however, circuit 26' incorporates a state machine 58' that is responsive to all four sync signals 114, 116, 122, 124.

Figure 8:
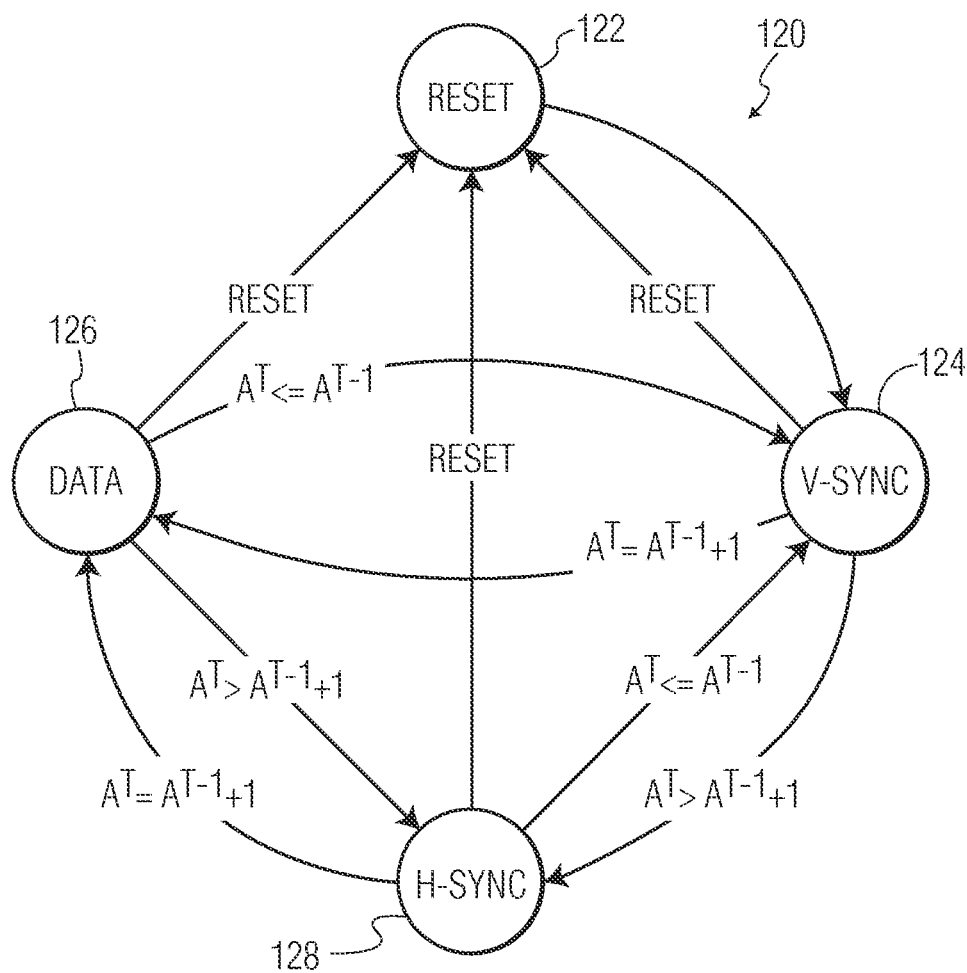
FIG. 8 illustrates an example state diagram of the operation of the producer and consumer sync circuits of FIG. 7.

The manner in which each sync circuit 24', 26' operates is further explained in connection with the state diagram 120 of FIG. 8. State diagram 120 includes a reset state 122 to which each circuit 24', 26' is initially set. Reset state 122 transitions to a v-sync state 124 during which the respective vertical sync signal 116, 124 is asserted. A transition to a data state 126, where no sync signal 114, 116, 122, 124 is asserted, occurs once a request is received having an address (AT) that represents the next sequential address relative to that of the previous request (represented as AT-1).

The respective circuit 24', 26' remains in state 126 until either a start of line or start of frame request is detected. A start of line request is detected by detecting a jump forward to an address other than the next sequential address to that of the current request (i.e., where AT>AT-1+1), and results in a transition to an h-sync state 128, where the respective horizontal sync signal 114, 122 is asserted. A start of frame request is detected by detecting an address that is less than or equal to that of the previous request, which results in a transition back to v-sync state 124 and assertion of the respective vertical sync signal 116, 124.

Of note, when in state 124, detection of a start of line request results in a transition to state 128. Similarly, when in state 128, detection of a start of frame request results in a transition to state 124, while detection of a next sequential address results in a transition to state 126. In addition, upon a reset, each of states 124, 126 and 128 transitions to state 122.

It should be noted that application software in the producer and consumer circuits program the address patterns of the producer and consumer data streams to conform to the requirements of the stream interface circuit, e.g., such that the start of each new line represents a jump forward to an address other than the next sequential address from the prior line, and such that the start of each new frame represents a jump back in the address space. In this regard, it may be desirable to provide for a programmable or hard coded stride to create a gap between adjacent lines. It may also be desirable when dual buffers are used to require the address for each buffer to be set to an identical address. It will be appreciated that other logic may be used to determine the start of lines and/or the start of frames in other implementations.

Figure 9:
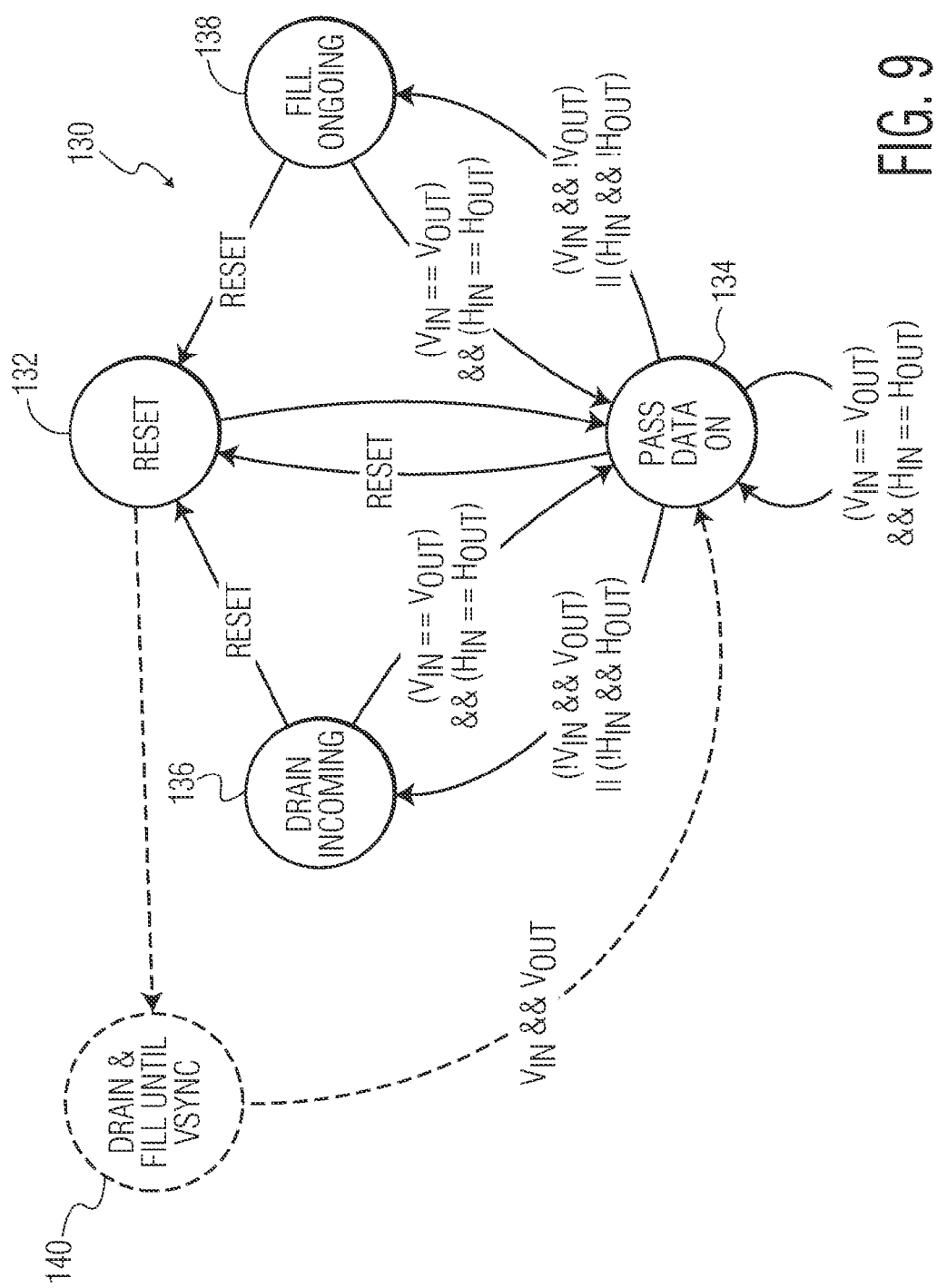
FIG. 9 illustrates an example state diagram of the operation of the state machine in the stream control circuit of FIG. 7.

Next, with reference to FIG. 9, the operation of state machine 58' is further illustrated by state diagram 130. Initially, state machine 58' begins in a reset state 132, and then transitions to a pass data on state 134. Based upon whether the producer horizontal or vertical sync signals 114, 116 (HIN and VIN) and the consumer horizontal or vertical sync signals 122, 124 (HOUT and VOUT) are asserted during each communication cycle, the state machine either remains in state 134 or transitions to one of a drain incoming state 136 and a fill outgoing state 138. Specifically, if all four sync signals 114, 116, 122, 124 are in the same state, state machine 58' remains in state 134, whereby data forwarded from the producer data stream is passed unchanged to the consumer data stream.

However, if either the consumer horizontal sync signal 122 or vertical sync signal 124 is asserted before either of producer sync signals 114, 116, a transition occurs to state 136, which results in state machine 58' controlling drain/fill circuit 60 to discard data from the producer IP block 12P, and thus prevent such data from being passed on to the consumer IP block 12C. In addition, it may be desirable at this time to stall the consumer IP block 12C from issuing any further requests, using any number of manners known in the art. State machine 58' remains in this state until sync signals 114, 116, 122, 124 are once again equal, which results in a transition back to state 134.

If either the producer horizontal sync signal 114 or vertical sync signal 116 is asserted before either of consumer sync signals 122, 124, a transition occurs to state 138, which results in state machine 58' controlling drain/fill circuit 60 to insert padding data into the consumer data stream. In addition, it may be desirable at this time to stall the producer IP block 12P from issuing any further requests. State machine 58' remains in this state until sync signals 114, 116, 122, 124 are once again equal, which results in a transition back to state 134. In addition, upon a reset, each of states 134, 136, 138 transitions to state 132. An additional state 140 may also be provided to support a condition where a soft-reset or exception handling is activated that would keep the producer and consumer circuits active. In state 140, all producer data is discarded and the remainder of the frame provided to the consumer circuit is finished with padding data, with a transition occurring back to state 134 at the beginning of the next frame (assertion of both vertical sync signals 116, 124).

Various modifications may be made without departing from the spirit and scope of the invention. For example, it will be appreciated that block writes and/or reads may be supported, whereby the decision logic for generating sync signals may need to accommodate such block operations. In addition, it may be desirable to support programmable synchronization, e.g., by programming a pitch value (where the pitch is the difference in address between vertically adjacent pixels). In a video frame, for example, setting a pitch value to zero may be used to synchronize on a per-line basis, while setting a pitch value to a value larger than the number of addresses per line may be used to synchronize on a per-frame basis instead. As another alternative, it may be desirable to include a buffer or FIFO within a stream interface circuit (e.g., between a producer sync generation circuit and a stream control circuit) to decouple producer and consumer circuits from having to work in lock-step.

The foregoing merely illustrates the principles of the invention. It will thus be appreciated that those skilled in the art will be able to devise various arrangements which, although not explicitly described or shown herein, embody the principles of the invention and are thus within its spirit and scope. In addition, it will be appreciated that the implementation of the various functions described herein in suitable logic designs would be well within the abilities of one of ordinary skill in the art having the benefit of the instant disclosure. These and other system configuration and optimization features will be evident to one of ordinary skill in the art in view of this disclosure, and are included within the scope of the following claims.

What is claimed is:

1. A method of communicating data between producer and consumer circuits, wherein each of the producer and consumer circuits is configured to communicate data over an address-based network using memory access requests that identify addresses in a memory address space, the method comprising:
   receiving from the producer circuit a plurality of memory access requests associated with a data stream output by the producer circuit, wherein each of the plurality of memory access requests received from the producer circuit identifies an associated address;
   receiving a plurality of memory access requests from the consumer circuit associated with a data stream expected by the consumer circuit, wherein each of the plurality of memory access requests received from the consumer circuit identifies an associated address;
   responsive to a comparison of addresses for the plurality of memory access requests received from the producer circuit, generating a first sync signal from the addresses identified thereby;
   responsive to a comparison of addresses for the plurality of memory access requests received from the consumer circuit, generating a second sync signal from the addresses identified thereby; and
   communicating data from the data stream output by the producer circuit to the consumer circuit over a communications link, including selectively modifying the data stream output by the producer circuit to a format expected by the consumer circuit responsive to the first and second sync signals.

2. The method of claim 1, wherein:
   generating the first sync signal includes comparing an address identified by a current memory access request from the producer circuit with an address identified by a previous memory access request from the producer circuit and selectively asserting the first sync signal based upon such comparison;
   generating the second sync signal includes comparing an address identified by a current memory access request from the consumer circuit with an address identified by a previous memory access request from the consumer circuit and selectively asserting the second sync signal based upon such comparison; and
   selectively modifying the data stream output by the producer circuit includes:
   if the first sync signal is asserted before assertion of the second sync signal, communicating padding data to the consumer circuit over the communications link in response to a memory access request received from the consumer circuit while the first sync signal is asserted; and
   if the second sync signal is asserted before assertion of the first sync signal, discarding data associated with a memory access request received from the producer circuit while the second sync signal is asserted to inhibit communication of such data over the communications link.

3. The method of claim 2, further comprising:
   if the first sync signal is asserted before assertion of the second sync signal, temporarily stalling the producer circuit from issuing additional memory access requests; and
   if the second sync signal is asserted before assertion of the first sync signal, temporarily stalling the consumer circuit from issuing additional memory access requests.

4. The method of claim 2, wherein selectively asserting the first sync signal is based upon determining that the address identified by the current memory access request from the producer circuit is less than or equal to the address identified by the previous memory access requests from the producer circuit.

5. The method of claim 2, wherein selectively asserting the second sync signal is based upon determining that the address identified by the current memory access request from the consumer circuit is less than or equal to the address identified by the previous memory access requests from the consumer circuit.

6. The method of claim 2, further comprising generating a notification when one of the first and second sync signals is asserted before the other of the first and second sync signals.

7. The method of claim 6, wherein the notification comprises an interrupt.

8. The method of claim 2, wherein the padding data comprises data associated with a previous memory access request from the producer circuit.

9. The method of claim 2, wherein the padding data comprises a default data value.

10. The method of claim 2, wherein the padding data comprises a programmable default data value.

11. The method of claim 1, wherein generating the first sync signal includes detecting from an address identified by a current memory access request from the producer circuit that the current memory access request is directed to a first address in a memory block being output by the producer circuit, and wherein generating the second sync signal includes detecting from an address identified by a current memory access request from the consumer circuit that the current memory access request is directed to a first address in a memory block being retrieved by the consumer circuit.

12. The method of claim 1, wherein the producer and consumer circuits are disposed on the same integrated circuit device, wherein each of the producer and consumer circuits comprises an IP block configured to communicate data over an address-based network, and wherein the communications link is a non-address-based communications link.

13. The method of claim 1, wherein each of the producer and consumer circuits comprises a video processing IP block, and wherein the memory access requests from the producer circuit are configured to communicate a video stream over the communications link.

14. The method of claim 1, further comprising enabling a mode in each of the producer and consumer circuits to communicate data over the communications link instead of an address-based network.

15. The method of claim 1, wherein the data is video data, wherein the first and second sync signals each comprise horizontal sync signals, wherein the method further comprises generating first and second vertical sync signals responsive to the memory access requests received from the producer and consumer circuits, and wherein selectively modifying the data stream output by the producer circuit to the format expected by the consumer circuit is further responsive to the first and second vertical sync signals.

16. The method of claim 1, wherein the plurality of memory access requests received from the producer circuit each comprise a write request, and wherein the plurality of memory access requests received from the consumer circuit each comprise a read request.

17. A circuit arrangement, comprising:
a communications link configured to communicate data received from a producer circuit to a consumer circuit, wherein each of the producer and consumer circuits is of the type that is capable of communicating data over an address-based network using memory access requests that identify addresses in a memory address space;

first sync signal generation logic configured to generate a first sync signal from a comparison of addresses for identifying a plurality of memory access requests received from the producer circuit and associated with a data stream output by the producer circuit;

second sync signal generation logic configured to generate a second sync signal from a comparison of addresses for identifying a plurality of memory access requests received from the consumer circuit and associated with a data stream expected by the consumer circuit; and control logic configured to communicate data from the data stream output by the producer circuit to the consumer circuit over the communications link, wherein the control logic is further configured to selectively modify the data stream output by the producer circuit to a format expected by the consumer circuit responsive to the first and second sync signals.

18. The circuit arrangement of claim 17, wherein the first sync signal generation logic is configured to generate the first sync signal by comparing the address identified by a current memory access request from the producer circuit with an address identified by a previous memory access request from the producer circuit and selectively asserting the first sync signal based upon such comparison, and wherein the second sync signal generation logic is configured to generate the second sync signal by comparing the address identified by a current memory access request from the consumer circuit with an address identified by a previous memory access request from the consumer circuit and selectively asserting the second sync signal based upon such comparison.

19. The circuit arrangement of claim 18, wherein the control logic is configured to selectively modify the data stream output by the producer circuit by:
if the first sync signal is asserted before assertion of the second sync signal, communicating padding data to the consumer circuit over the communications link in response to a memory access request received from the consumer circuit while the first sync signal is asserted; and
if the second sync signal is asserted before assertion of the first sync signal, discarding data associated with a memory access request received from the producer circuit while the second sync signal is asserted to inhibit communication of such data over the communications link.

20. The circuit arrangement of claim 19, wherein the control logic is further configured to temporarily stall the producer circuit from issuing additional memory access requests if the first sync signal is asserted before assertion of the second sync signal, and to temporarily stall the consumer circuit from issuing additional memory access requests if the second sync signal is asserted before assertion of the first sync signal.

21. The circuit arrangement of claim 19, wherein the padding data comprises data associated with a previous memory access request from the producer circuit.

22. The circuit arrangement of claim 19, wherein the padding data comprises a default data value.

23. The circuit arrangement of claim 19, wherein the padding data comprises a programmable default data value.

24. The circuit arrangement of claim 18, wherein the first sync signal generation logic is configured to selectively assert the first sync signal based upon determining that the address identified by the current memory access request from the producer circuit is less than or equal to the address identified by the previous memory access requests from the producer circuit.

25. The circuit arrangement of claim 18, wherein the second sync signal generation logic is configured to selectively assert the second sync signal based upon determining that the address identified by the current memory access request from the consumer circuit is less than or equal to the address identified by the previous memory access requests from the consumer circuit.

26. The circuit arrangement of claim 18, wherein the control logic is further configured to generate a notification when one of the first and second sync signals is asserted before the other of the first and second sync signals.

27. The circuit arrangement of claim 26, wherein the notification comprises an interrupt.

28. The circuit arrangement of claim 18, wherein the data is video data, wherein the first and second sync signals each comprise horizontal sync signals, wherein the circuit arrangement is further configured to generate first and second vertical sync signals responsive to the memory access requests received from the producer and consumer circuits, and wherein the control logic is further configured to selectively modify the data stream output by the producer circuit to the format expected by the consumer circuit responsive to the first and second vertical sync signals.

29. The circuit arrangement of claim 17, wherein the first sync signal generation logic is configured to generate the first sync signal by detecting from an address identified by a current memory access request from the producer circuit that the current memory access request is directed to a first address in a memory block being output by the producer circuit, and wherein the second sync signal generation logic is configured to generate the second sync signal by detecting from an address identified by a current memory access request from the consumer circuit that the current memory access request is directed to a first address in a memory block being retrieved by the consumer circuit.

30. The circuit arrangement of claim 17, wherein each of the producer and consumer circuits comprises an IP block configured to communicate data over an address-based network disposed on the same integrated circuit device as both of the producer and consumer circuits, and wherein the communications link is a non-address-based communications link.

31. The circuit arrangement of claim 17, wherein each of the producer and consumer circuits comprises a video processing IP block, and wherein the memory access requests from the producer circuit are configured to communicate a video stream over the communications link.

32. The circuit arrangement of claim 17, wherein the plurality of memory access requests received from the producer circuit each comprise a write request, and wherein the plurality of memory access requests received from the consumer circuit each comprise a read request.

33. An integrated circuit device comprising the producer circuit, the consumer circuit and the circuit arrangement of claim 17.

\* \* \* \* \*